(12) United States Patent
DeRoos et al.

(10) Patent No.: US 9,177,032 B2
(45) Date of Patent: Nov. 3, 2015

(54) DECISION DEVICE AND METHOD THEREOF

(75) Inventors: Stephen M DeRoos, Vancouver, WA (US); Miles K Thorland, Fort Collins, CO (US); Stephen M. Brethauer, Windsor, CO (US); Craig M Blackwood, La Jolla, CA (US); John A Landry, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/240,391

(22) PCT Filed: Sep. 30, 2011

(86) PCT No.: PCT/US2011/054354
§ 371 (c)(1),
(2), (4) Date: Feb. 22, 2014

(87) PCT Pub. No.: WO2013/048459
PCT Pub. Date: Apr. 4, 2013

(65) Prior Publication Data
US 2014/0231504 A1    Aug. 21, 2014

(51) Int. Cl.
*G06F 17/00*    (2006.01)
*G06F 17/30*    (2006.01)
*G06Q 10/06*    (2012.01)

(52) U.S. Cl.
CPC .......... *G06F 17/30554* (2013.01); *G06Q 10/06* (2013.01)

(58) Field of Classification Search
USPC .......................... 235/375, 487, 462.09, 462.1
See application file for complete search history.

(56) References Cited

U.S. PATENT DOCUMENTS

| 6,857,013 | B2 | 2/2005 | Ramberg et al. | |
|---|---|---|---|---|
| 7,926,718 | B2 | 4/2011 | Miyashita et al. | |
| 8,055,887 | B2 | 11/2011 | Karstens | |
| 2002/0074407 | A1* | 6/2002 | Koyanagi et al. | 235/462.16 |
| 2004/0089727 | A1* | 5/2004 | Baharav et al. | 235/494 |
| 2007/0152061 | A1 | 7/2007 | Blanford | |
| 2007/0168571 | A1 | 7/2007 | Ramsey et al. | |
| 2009/0108057 | A1 | 4/2009 | Mu et al. | |
| 2009/0157530 | A1 | 6/2009 | Nagamoto et al. | |
| 2009/0250512 | A1* | 10/2009 | Deck et al. | 235/375 |

(Continued)

FOREIGN PATENT DOCUMENTS

| JP | 2005333379 | 12/2005 |
|---|---|---|
| JP | 2006252053 | 9/2006 |

(Continued)

OTHER PUBLICATIONS

Maurief, E.; Computer Troubleshooting-QR Codes for Android Cell Phones; http://www.pcissue.com/qr-codes-for-android-cell-phones/; Jun. 14, 2011.

(Continued)

*Primary Examiner* — Edwyn Labaze
(74) *Attorney, Agent, or Firm* — Hewlett-Packard Patent Department (57) ABSTRACT

Decision devices, systems, and methods to provide a product resource are provided herein. The decision devices include an analysis engine. The analysis engine receives an information resource and at least one product parameter. The analysis engine searches the information resource to identify at least one search result and dynamically analyzes the at least one search result to provide the product resource.

15 Claims, 7 Drawing Sheets

(56) References Cited

U.S. PATENT DOCUMENTS

| | | |
|---|---|---|
| 2010/0174599 A1 | 7/2010 | Rosenblatt et al. |
| 2010/0211687 A1 | 8/2010 | Jaber et al. |
| 2010/0228585 A1 | 9/2010 | Bradley |
| 2010/0296744 A1* | 11/2010 | Boon et al. .................. 382/233 |
| 2010/0325490 A1 | 12/2010 | Anvin et al. |
| 2011/0073647 A1 | 3/2011 | Chiou |
| 2011/0154009 A1 | 6/2011 | Harmer |
| 2011/0258031 A1* | 10/2011 | Valin et al. ................ 705/14.39 |
| 2011/0264645 A1* | 10/2011 | Mital et al. .................... 707/708 |
| 2012/0223131 A1* | 9/2012 | Lim et al. ....................... 235/375 |
| 2013/0026241 A1* | 1/2013 | Sakahashi et al. ............ 235/494 |
| 2014/0231504 A1 | 8/2014 | DeRoos et al. |

FOREIGN PATENT DOCUMENTS

| | | |
|---|---|---|
| JP | 2009140204 | 6/2009 |
| JP | 2011008693 | 1/2011 |

OTHER PUBLICATIONS

Utkarsh; QR Codes Resolved; http://mtaram.com/blog/2011/04/11/qr-codes-resolved/#axzz1PsycFGjG; Apr. 11, 2011.

Final Office Action, U.S. Appl. No. 13/550878, Issued: Oct. 30, 2014, pp. 1-10.

IBM, "A Method of Providing Error Handling Information of a Digital Equipment Using a Two-Dimensional Bar Code and a Cellular Phone," Apr. 4, 2006, pp. 1-4.

* cited by examiner

DECISION DEVICE AND METHOD THEREOF

CROSS-REFERENCE TO RELATED PATENTS APPLICATIONS

This is the U.S. national stage claimant the benefit of International Application No. PCT/US2011/054354, filed on Sep. 30, 2011.

BACKGROUND

Matrix codes are used to encode information, such as a specific web address or uniform resource locator. For example, users scan matrix codes with a scanning device connected to the internet and access the specified web address therethrough.

BRIEF DESCRIPTION OF THE DRAWINGS

Non-limiting examples of the present disclosure are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components and features illustrated in the figures are chosen primarily for convenience and clarity of presentation and are not necessarily to scale. Referring to the attached figures:

DETAILED DESCRIPTION

In the following detailed description, reference is made to the accompanying drawings which form a part hereof, and in which is depicted by way of illustration specific examples in which the present disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims.

Matrix codes encode information to allow a user to access a specific web address or uniform resource locator. The specific web address is predetermined or hard coded into the matrix code at the time the matrix code is created. At times it is desired to obtain information from a website or the internet, but not know the specific web address. For example, when a product, such as a computer or household appliance, encounters an event that provides an error code, the web address for general diagnostics may be provided. The user then searches for a specific solution within the website. Many products either do not have any access to the internet or do not have access to the internet when the event occurs. Moreover, the error code and/or web address may be long and require the user to manually enter such information into a web browser on a remote device. Manual entry may result in erroneous entries and/or frustration to users.

A decision device and system and method useable with the decision device are provided herein. The decision device includes an analysis engine that receives an information resource and at least one product parameter. The analysis engine searches the information resource using the at least one product parameter to identify at least one search result. The analysis engine also dynamically analyzes the at least one search result to provide the product resource. The product resource includes information related to a product and the at least one product parameter.

Information codes, such as matrix codes, may encode web addresses and parameters, such as the error code. The information code may then be scanned and analyzed by the decision device with access to the internet and/or a database with product resources. The decision device provides specific product resources that enable users to obtain additional information related to the user's specific product and targeted to the specified parameters. The additional information provided in the information code may include a solution, a diagnostic evaluation result, product details, and/or access to a customer service representative based on the specific parameters obtained from the specific product.

Figure 1:
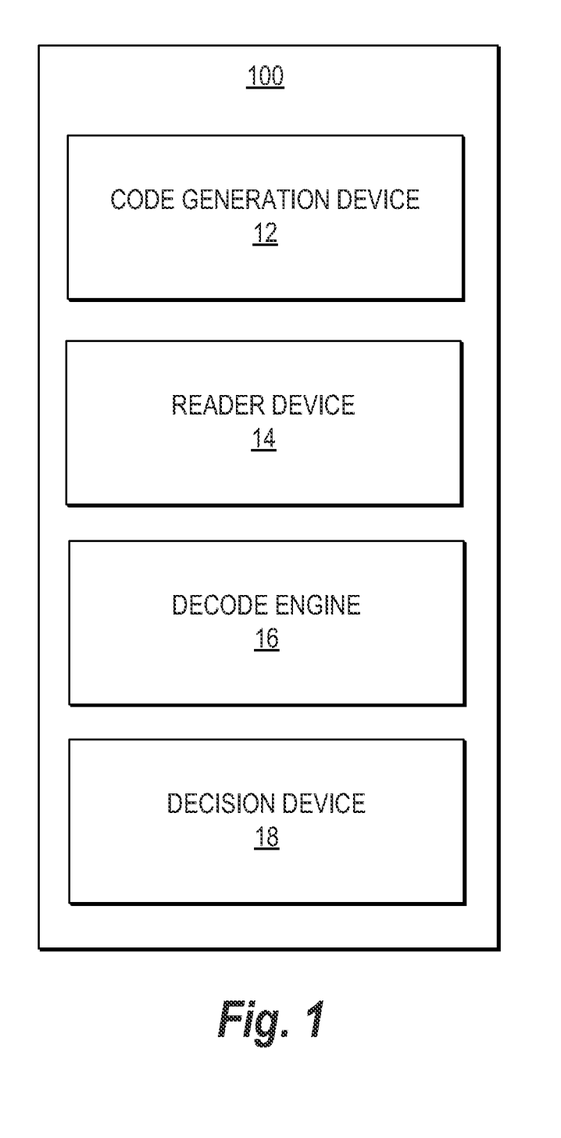
FIG. 1 illustrates a block diagram of a system to provide a product resource according to an example.

FIG. 1 illustrates a system to provide a product resource according to an example. The product resource may include a diagnostic solution to an error message, a maintenance or installation instruction, additional product information, and/or access to a customer service representative. The system 100 includes a code generation device 12, a reader device 14, a decode engine 16, and a decision device 18.

Figure 2:
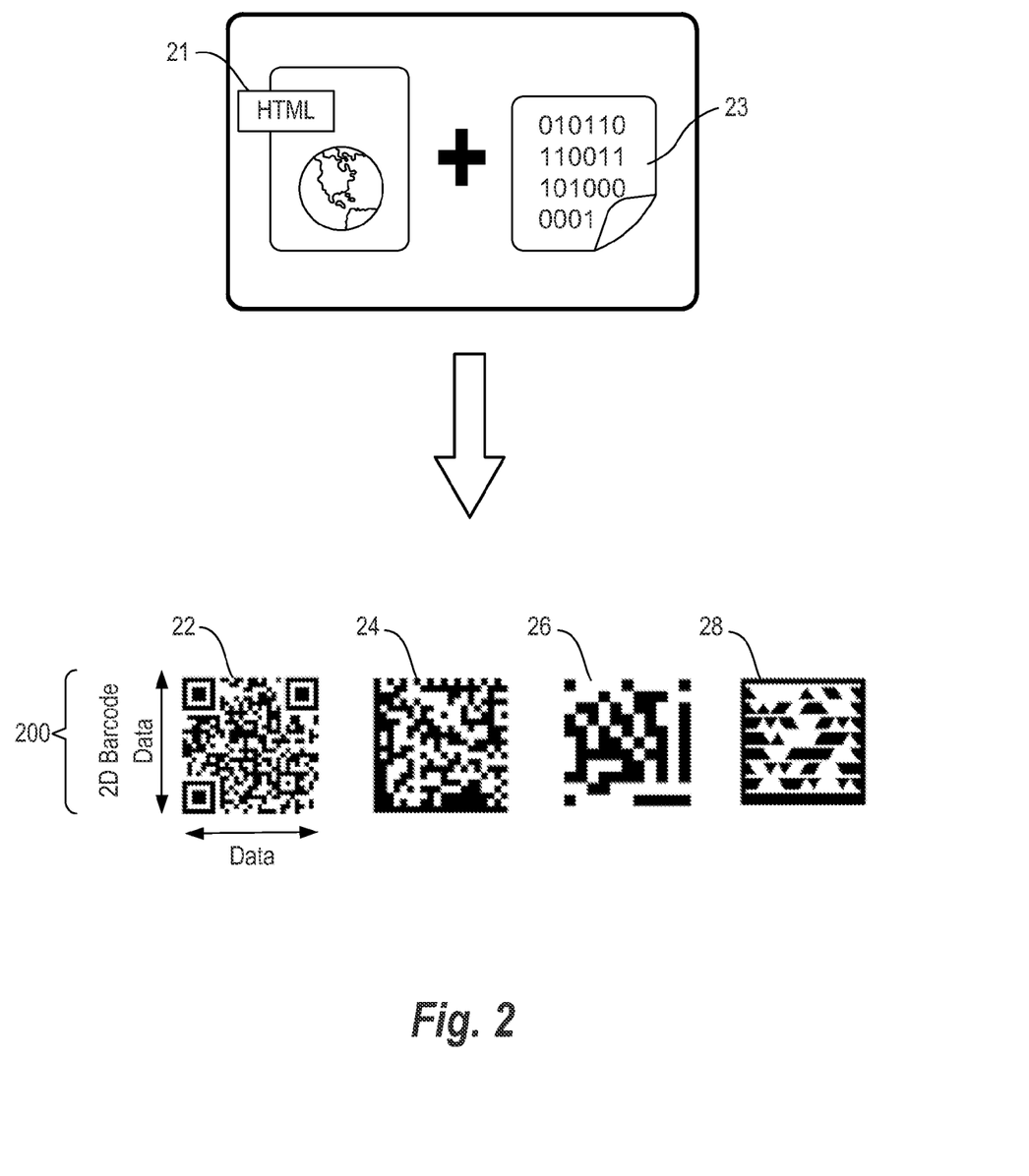
FIG. 2 illustrates information codes according to examples.

The code generation device 12 generates an information code. For example, the information code may be a matrix code, such as a two-dimensional barcode, that is scanable. FIG. 2 illustrates information codes 200 according to examples, such as a QR Code® 22, a data matrix 24, an EZCode® 26, and/or a Microsoft® Tag 28. The information codes 200 illustrated provide the ability to transfer a large amount of data using one or more simple codes. The use of the term information code 200 refers to one or more codes contain data that may be read individually and/or in combination with another code. For example, a single information code 200 and/or multiple information codes 200 may be concatenated together to store and provide information in a simple and efficient manner.

The information code 200 includes an information resource 21 and at least one product parameter 23 encoded therein. The information resource 21 may be a web address to a general search engine, a specific product and/or manufacturer web site, and/or access to a dedicated database stored on the decision device 18 and/or a remote server. The information resource 21 provides a general resource that may provide additional information, but does not need to provide a static web address of a specified solutions or information page identifiable at the time the information code 200 is generated. The at least one product parameter 23 may include data related to the product, such as an error or event code, a product identifier, a device language, a user language, a serial number, and/or a version. The at least one product parameter 23 may also include an encryption identifier useable when the code generation device 12 to encrypt data in the information code 200. The decision device 18 uses the at least one product parameter 23 with the information resource 21 to dynamically provide additional information, such as a solution, to a problem, assistance diagnosing a problem, and/or assistance getting customer service.

The information code 200 provides a dynamically generated code that combines the information resource 21 and the at least one product parameter 23. For example, the information code 200 may be generated using the information resource 21 that is a generic web address and at least one product parameter 23 obtained from the product in a state determined at the time the information code 200 is generated. Therefore, the product resource that is obtained using the information code 200 is not hardcoded into the code, but dynamically generated based on the state of the product at the time the information code 200 is generated.

The code generation device 12 may be integrated into the product and/or connected thereto to generate the information code 200. For example, an error code may be generated on a device not connected to the internet, such as a refrigerator. The error code may be transmitted to a device connected to the internet, such as a web-enabled mobile device and/or a computer, using the information code 200 via the reader device 14. The code generation device 12 may also encrypt at least one of the information resource 21 and the at least one product parameter 23 that is encoded in the information code 200 for secure transmission of the information code 200.

Figure 3:
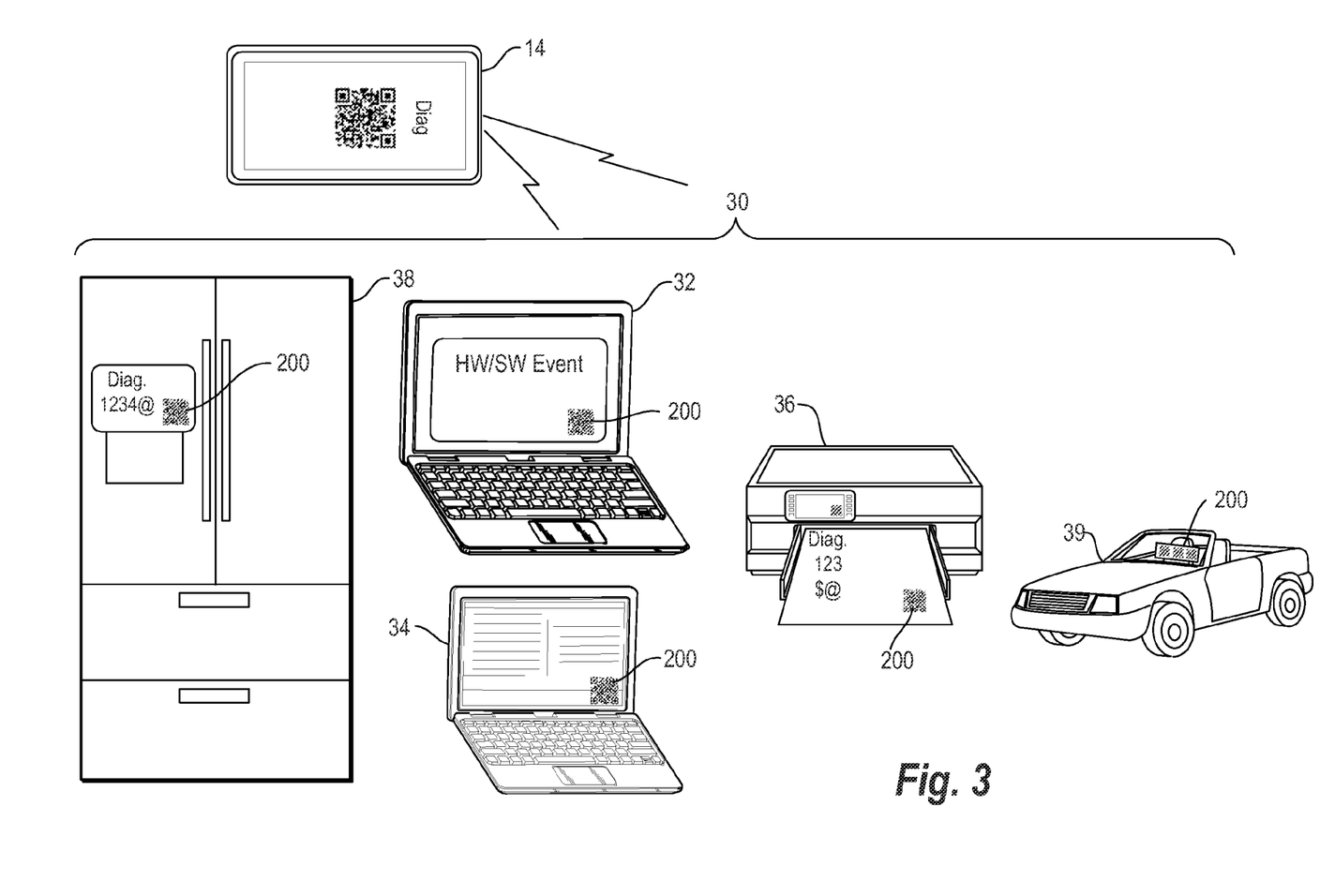
FIG. 3 illustrates examples of the reader device and products that may use the code generation device.

The reader device 14 obtains the information code 200 from a product. FIG. 3 illustrates the reader device 14 and products 30 useable with the code generation device 12 according to examples. The reader device 14 may be a standalone device with a decode engine 16 connected there to. Alternatively, the reader device 14 may be connected to and/or integrated into the decision device 18, which has access to the internet. The reader device 14 reads one or more information code 200 and the decode engine 16 decodes the information code 200 to obtain the information resource 21 and the at least one product parameter 23. The decode engine 16 may utilize an error correction feature that corrects errors in the information code 200 obtained by the reader device 14.

The reader device 14 is illustrated as a mobile telephone with a camera. The camera may capture an image of the information code 200, and the mobile telephone may include a decode engine 16 that decodes the information code 200 and obtains the information resource 21 and the at least one product parameter 23 therefrom. Other examples include a special scanning device and/or a web camera that may take a picture of an information code 200, such as a two-dimensional barcode or matrix code and read, transmit, and/or interpret the information encoded therein.

The term product refers to a good, a service, and/or a combination thereof. Examples of the products 30 include a computing device with hardware and/or software that register an event or message 32, a computing device with operating system messages 34, such as an error before an operating system loads and/or installation instructions (i.e., uniform extensible firmware interface (UEFI), basic input/output system (BIOS)), a printer 36 with an error messages, a household appliance, such as a refrigerator 38 with an error or maintenance message, and/or an automobile 39 with an error or maintenance message. Use of the information codes 200 in products that have limited access to a user interface and/or the internet provides a user with a more valuable tool to obtain additional information using the decision device 18. For example, the decision device 18 may be used with a computing device with operating system messages 34, a refrigerator 38, and/or an automobile 39, all of which may have limited access to a user interface and/or the internet. Moreover, the automobile 39 illustrates an information code 200 that contains multiple information codes 200, illustrated as three information codes 200 that when concatenated may provide a larger amount of information than, for example, a single two-dimensional barcode provides. The information code 200 may be concatenated by the reader device 14 and/or the decision device 18 in accordance to device capabilities and application contained therein.

Figure 4:
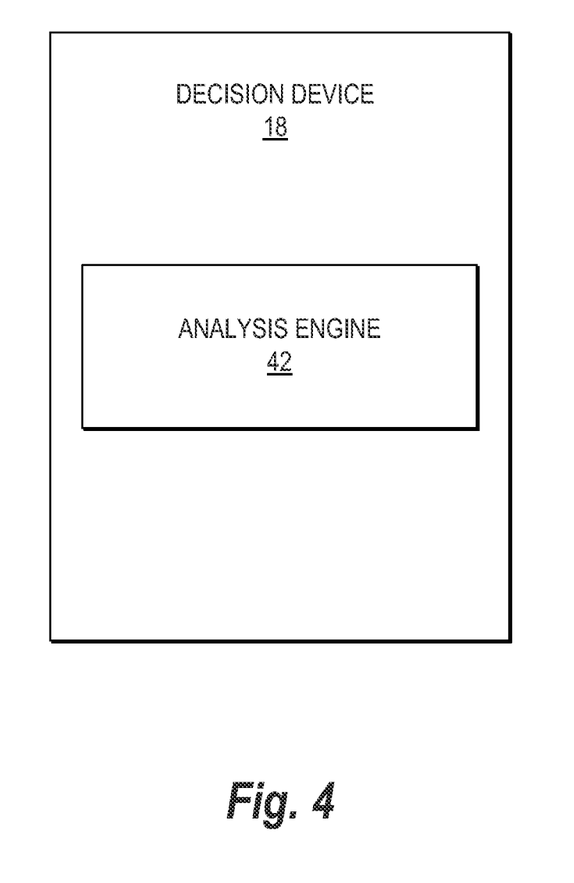
FIG. 4 illustrates a block diagram of a decision device according to an example.

FIG. 4 illustrates a decision device 18 to provide a product resource according to an example. The decision device 18 is connected to the decode engine 16 and obtains the information code 200 therefrom. The decision device 18 may be a server and/or other computing device that is connected to the internet or other network having access to a database. The decision device 18 includes an analysis engine 42.

The analysis engine 42 searches the information resource 21 using the at least one product parameter 23 to identify at least one search result. Then, the analysis engine 42 dynamically analyzes the at least one search result to provide the product resource, including information related to a product 30 and at least one product parameter 23. Examples of the information related to a product 30 include a diagnostic solution, a query response, a customer service contact, and/or the at least one product parameter. The product resource includes information specific to a product 30 and/or event code. The product resource may be filtered according to the parameter(s) and may include a solution and/or information that is up to date and/or may change throughout the product's 30 lifecycle. The analysis engine 42 may also decrypt the information resource 21 and/or the at least one product parameter 23 when such information is encrypted by the code generation device 12. The decryption analysis engine 42 may receive an encryption identifier and/or an encryption key from the information code 200 decoded by the reader device 14, when the encryption identifier and/or the encryption key are encoded in the information code 200.

Figure 5:
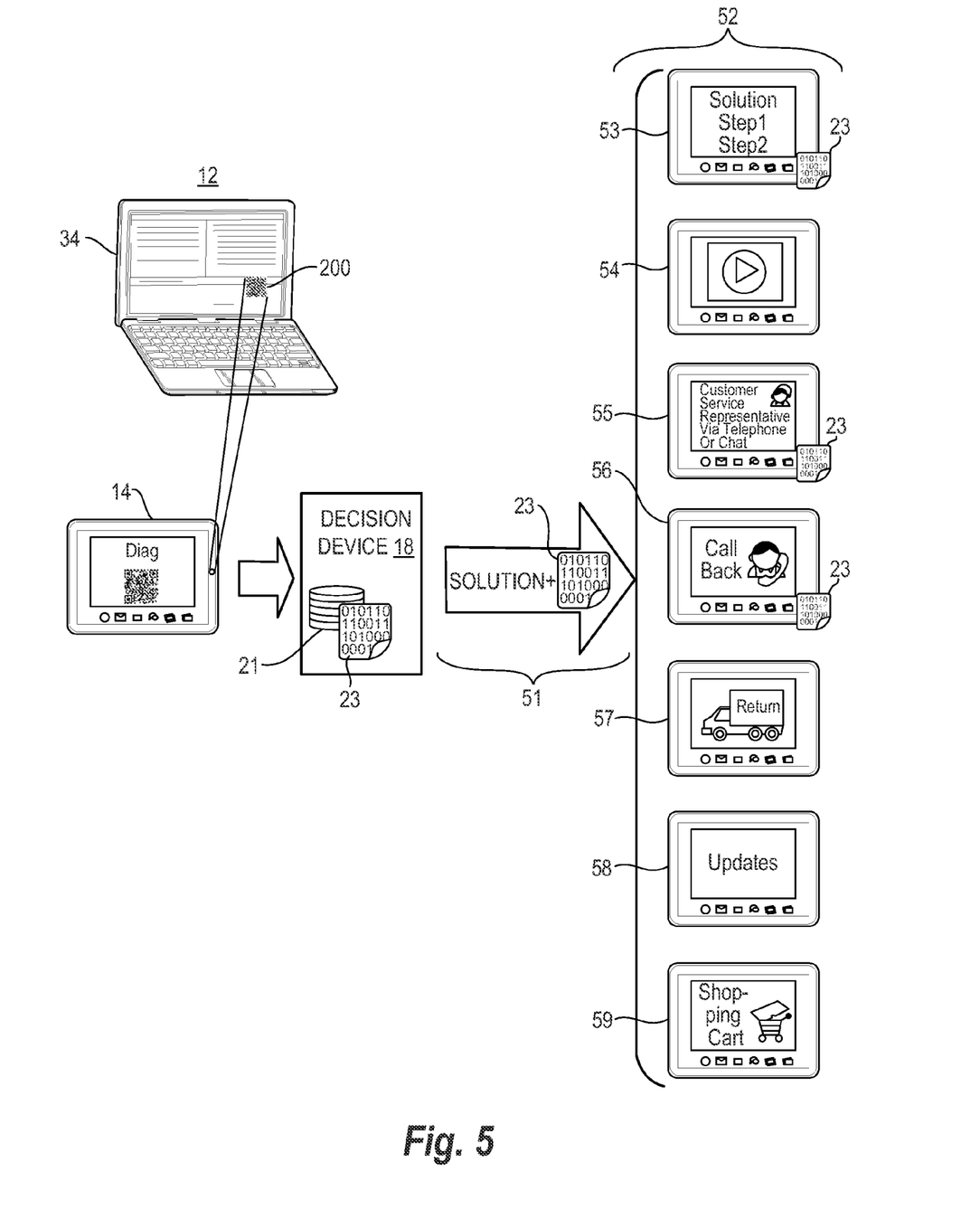
FIG. 5 illustrates use of the decision device to provide product information to a user according to examples.

FIG. 5 illustrates use of the decision device 18 to provide product resource(s) to a user according to examples. FIG. 5 includes the information code 200 on a computing device with operating system messages 34. For example, in a UEFI environment diagnosis of a problem with the computing device that is preventing an operating system from starting up in the primary operating environment. The information code 200 provides the user a method to use a reader device 14, for example, an imaging device, such as a mobile device with a camera, to find a solution or to troubleshoot the problem with the UEFI based device. The reader device 14 is separate from the computing device with the operating system message 34. Since the computing device is not completely functional in its current state, the reader device 14 is used to obtain the additional information using the decision device 18.

Referring to FIG. 5, the information code 200 is read by the reader device 14, illustrated as a mobile device, such as a tablet. The reader device 14 captures the information code 200 and decodes it. The decision device 18 receives the information resource 21 and the at least one product parameter 23 from the reader device 14 and/or decode engine 16. The analysis engine 42 may also decrypt the information resource 21 and/or the at least one product parameter 23 using an encryption identifier or encryption key when the information code 200 includes encrypted information. The analysis engine 42 of the decision device 18 then provides the product resource 51 to the user.

The product resource 51 is illustrated to include the parameter(s) that were part of the information code 200. The product resource 51 may be presented to a user via a user interface, for example, a display 52. The display 52 may be connected to the decision device 18, such as a computer monitor; and/or integrated into the decision device 18, such as a mobile device with a screen. Examples of the product resource(s) 51 are illustrated in FIG. 5. The product resource 51 may also include a set of instructions that include information extracted from the product parameter(s) 23. The set of instructions may be a diagnostic solution to an error code and/or installation instructions to install and/or reinstall a hardware and/or software portion of the product 30. The set of instructions may be presented via an audio or visual presentation device, such as a list of instructions 53 and/or an audio and/or video presentation 54 with the instruction contained therein.

Another example includes a product resource 51 that allows a user to interact with a customer service representative 55, such as via a real-time chat over the internet and/or via telephone. Moreover, the user may receive a call back 56 from the customer service representation or an automated messaged that provides the product resource 51 to the user. For example, the call back 56 may be via the reader device 14 and/or a device connected to the reader device 14 that has a microphone and speaker attached thereto. The product resource 51 may also automatically transmit and/or provide the at least one product parameter to enable the customer service representative to better assist users. For example, the customer service representative may know the problem, the solution, product serial code, and/or warranty information, without the user manually (i.e., via typing or orally) transmitting data contained in the product parameter(s) 23.

The product resource 51 may further provide instructions for returning 57 the product, receiving an update 58 to the product, such as software updates; and/or a shopping cart 59 to order replacement and/or additional parts that the user may need to correct an error, replace a part, and/or correct a faulty part. The product resource 51 may provide users with information to return, and/or obtain additional and/or replacement parts. The product resource 51 information may assist the user in composing requests by automatically transferring information about the product, such as the product parameter(s) 23 using the decision device 18.

Figure 6:
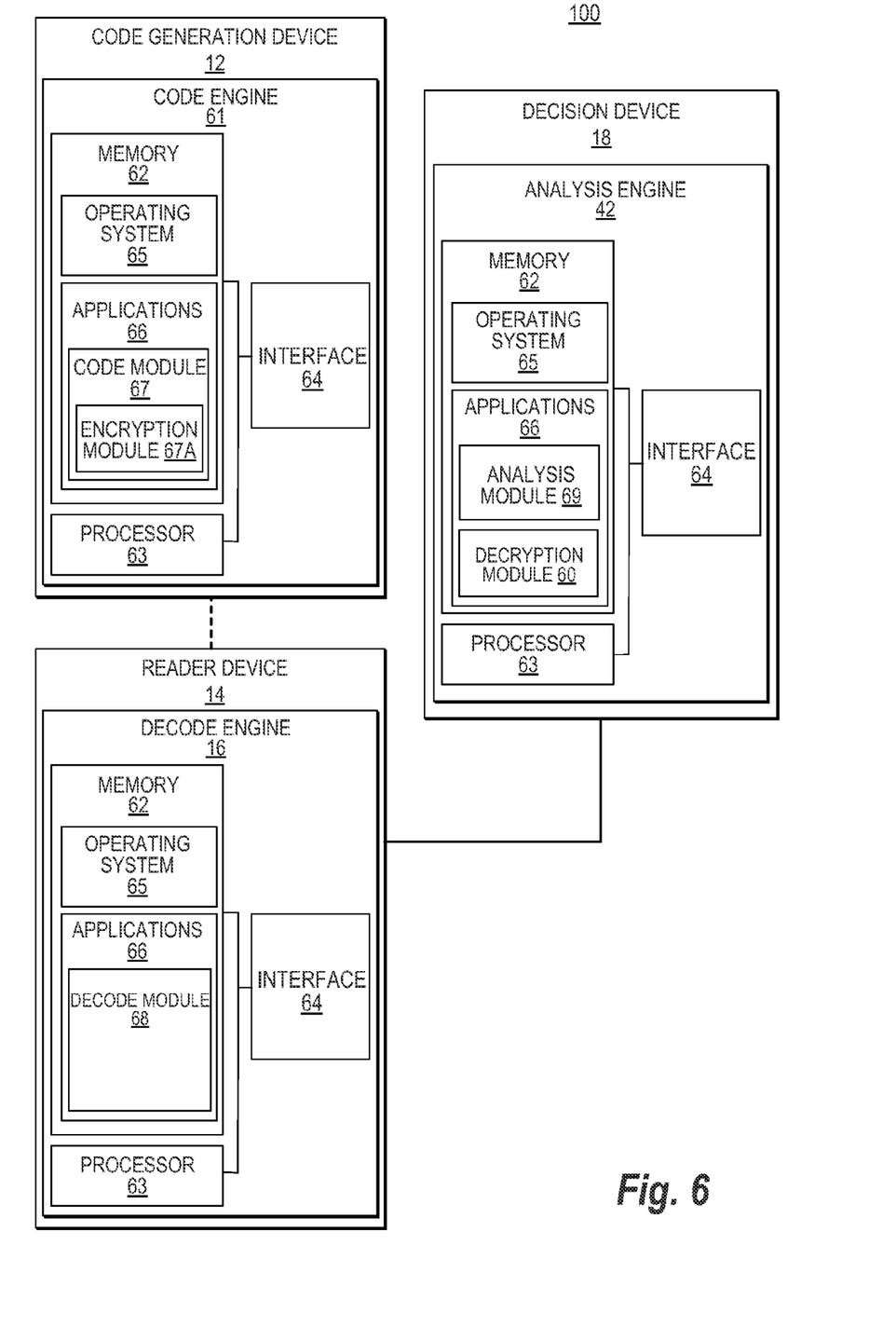
FIG. 6 illustrates a schematic view of the system of FIG. 1 according to an example.

FIG. 6 illustrates a schematic view of the system 100 of FIG. 1 according to an example. As discussed above the system 100 includes a code generation device 12, a reader device 14, and a decision device 18. The code generation device 12 may for example be included in a computer system and/or may be formed from electrical components. When the code generation device 12 is part of a computer, it may include a code engine 61. The code engine 61 represents generally any combination of hardware and/or software to generate the information code 200. For example, the code engine 61 in FIG. 6 includes a memory 62 to store a set of instructions to generate the information code 200, a processor 63 to execute the set of instructions, and an interface 64. The processor 63 represents generally any processor configured to execute program instructions stored in memory 62 to perform various specified functions. The interface 64 represents generally any interface on the code generation device 12 that displays the information code 200.

The reader device 14 illustrated includes the decode engine 16; however, reader device 14 and the decode engine 16 may be on separate devices that are connected to one another. The decode engine 16 represents generally any combination of hardware and/or software to decode the information code 200. For example, the decode engine 16 in FIG. 6 includes a memory 62 to store a set of instructions to decode the information code 200, a processor 63 to execute the set of instructions, and an interface 64. The processor 63 represents generally any processor configured to execute program instructions stored in memory 62 to perform various specified functions. The interface 64 represents generally any interface on the decision device 18 that displays the product resource 51.

The decision device 18 includes an analysis engine 42, as discussed above with reference to FIG. 4. The analysis engine 42 represents generally any combination of hardware and/or software to analyze the information code 200. For example, the analysis engine 42 in FIG. 6 includes a memory 62 to store a set of instructions to search the information code 200 and dynamically analyze the search results, a processor 63 to execute the set of instructions, and an interface 64. The processor 63 represents generally any processor configured to execute program instructions stored in memory 62 to perform various specified functions. The interface 64 represents generally any interface on the decision device 18 that displays the product resource 51.

The memory 62 is illustrated to include an operating system 65 and applications 66. The operating system 65 represents a collection of programs that when executed by the processor 63 serve as a platform on which applications 66 may run. Examples of operating systems 65 include various versions of Microsoft's Windows®, Apple's Mac OS®, and Google's Android™.

Applications 66 represent program instructions that when executed by the processor 63 functions as an application. For example, in the code engine 61, the applications 66 function as an information code generator. The executable program instructions stored in memory 62 are illustrated as including a code module 67. The code module 67 represents program instructions that when executed by a processor 63 cause the implementation of the code engine 61. The executable instructions stored in the code module 67 may include the set of instructions from the memory 62 and/or a database external to the code engine 61. In response to the code software being initiated, the code module 67 provides instructions to the processor 63. The processor 63 executes the instructions to generate the information code 200 and provide the information code 200 to a user via the interface 64. The code module 67 may further include an encryption module 67A to encrypt the at least one of the information resource 21 and the at least one product parameter within the information code 200.

In the decode engine 16, the applications 66 function as a decoder. The executable program instructions stored in memory 62 are illustrated as including a decode module 68. The decode module 68 represents program instructions that when executed by a processor 63 cause the implementation of the decode engine 16. The executable instructions stored in the decode module 68 may include the set of instructions from the memory 62 and/or a database external to the decode engine 16. In response to the decode software being initiated, the decode module 68 provides instructions to the processor 63. The processor 63 executes the instructions to decode the information code 200 and extract the information resource 21 and the at least one product parameter 23 therefrom.

In the analysis engine 42, the applications 66 function as an analyzer and decision maker. The executable program instructions stored in memory 62 are illustrated as including an analysis module 69 and a decryption module 60. The analysis module 69 represents program instructions that when executed by a processor 63 cause the implementation of the analysis engine 42. The executable instructions stored in the analysis module 69 may include the set of instructions from the memory 62 and/or a database external to the analysis engine 42. In response to the analysis being initiated, the analysis module 69 provides instructions to the processor 63. The processor 63 executes the instructions to search the information resource 21 using the at least one product parameter 23 to identify at least one search result. The processor 63 further executes the instructions to dynamically analyze the at least one search result to provide the product resource 51. The product resource 51 may then be provided to a user via the interface 64.

The analysis module 42 may further include a decryption module 60. The decryption module 60 may be used prior to the analysis module 69 when the information resource 21 and the at least one product parameter 23 of the information code 200 is encrypted.

Referring to FIG. 6, the code engine 61, the decode engine 16, and the analysis engine 42 are described as combinations of hardware and/or programming. The hardware portions may include the processor 63. The programming portions may include the operating system 65, applications 66, and/or combinations thereof. The programming may be processor executable instructions stored on a tangible memory media and the hardware may include a processor 63 to execute the instructions. The memory 62 may store program instructions that when executed by the processor 63 cause the processor 63 to perform the program instructions. The memory 62 may be integrated in the same device as the processor 63 or it may be separate but accessible to that device and the processor 63.

In some examples, the program instructions may be part of software that may be executed by the processor 63 to perform a method using the system 100. The memory 62 may be a portable medium such as a CD, DVD, or flash drive or a memory maintained by a server from which the software may be downloaded and installed. In other examples, the program instructions may be part of an application or applications already installed in the product. In further examples, the memory 62 may include integrated memory such as a hard drive.

Figure 7:
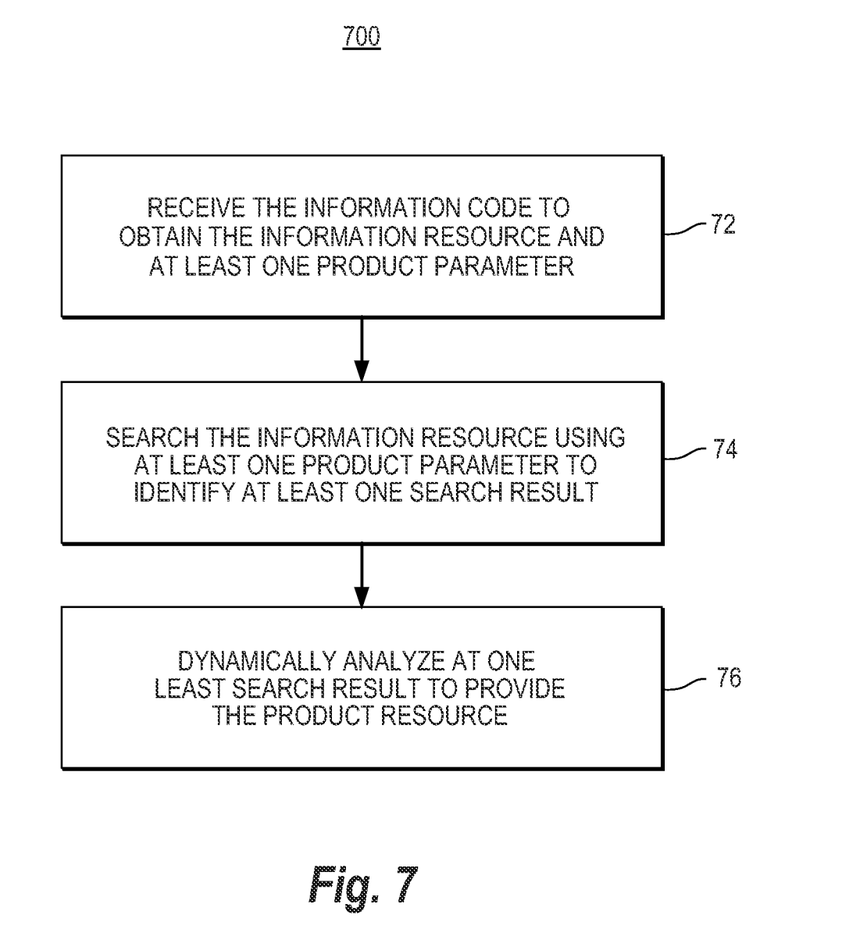
FIG. 7 illustrates a method to provide a product resource according to an example.

FIG. 7 illustrates a method 700 to provide a product resource according to an example. In block 72, the decision device receives an information resource and at least one product parameter that is obtained from an information code. The information code may be obtained from the product by scanning the information code with a reader device connected to the decision device. For example, the reader device may include a mobile phone with a camera or a web camera that takes a picture of the information code, and/or a separate scanner that is connected to the decision device via the Internet. The data contained in the information code read by the reader device may be encrypted with the code generation device. The information code may be generated with a code generation device. The code generation device may be connected to a product, such as integrated into a display on the product.

The decision device receives the information code from a decode engine that is connected to the decision device. The decode engine may be connected to or integrated into the reader device. The decode engine decodes the information code to obtain the information resource and the at least one product parameter.

In block 74, the decision device searches the information resource using the at least one product parameter to identify at least one search result. The decision device dynamically analyzes the at one least search result to provide the product resource, in block 76. The product resource provides information related to the product and may also include the at least one product parameter. The information related to the product may include at least one of a diagnostic solution, a query response, and a customer service contact.

In cases that the information code 200 contains encrypted data, for example, the information resource 21 and/or the at least one product parameter 23 are encrypted, the decision device may decrypt the encrypted information resource 21 and/or the at least one product parameter 23 using an encryption identifier and/or encryption key contained in the information code 200.

The present disclosure has been described using non-limiting detailed descriptions of examples thereof and is not intended to limit the scope of the present disclosure. It should be understood that features and/or operations described with respect to one example may be used with other examples and that not all examples of the present disclosure have all of the features and/or operations illustrated in a particular figure or described with respect to one of the examples. Variations of examples described will occur to persons of the art. Furthermore, the terms "comprise," "include," "have" and their conjugates, shall mean, when used in the present disclosure and/ or claims, "including but not necessarily limited to."

It is noted that some of the above described examples may include structure, acts or details of structures and acts that may not be essential to the present disclosure and are intended to be exemplary. Structure and acts described herein are replaceable by equivalents, which perform the same function, even if the structure or acts are different, as known in the art. Therefore, the scope of the present disclosure is limited only by the elements and limitations as used in the claims.

What is claimed is:

1. A system to provide a product resource, the system comprising:
    a code generation device to dynamically generate an information code, the information code having an information resource and at least one product parameter encoded therein, the information resource provides a general resource that does not provide a static web address identifiable at the time the information code is generated;
    a reader device to obtain the information code;
    a decode engine to decode the information code to obtain the information resource and the at least one product parameter therefrom, and
    a decision device connected to the reader device, the decision device having an analysis engine to:
        search the information resource using the at least one product parameter to identify at least one search result, and
        dynamically analyze the at least one search result to provide the product resource, wherein the product resource includes information related to a product and the at least one product parameter.

2. The system of claim 1, wherein the information code comprises a two-dimensional bar code.

3. The system of claim 1, further comprising a display to provide the product resource to a user.

4. The system of claim 1, wherein the code generation device encrypts at least one of the information resource and the at least one product parameter.

5. The system of claim 4, wherein the analysis engine decodes at least one of the information resource and the at least one product parameter using at least one of an encryption identifier and an encryption key encoded within the information code.

6. A decision device to provide a product resource, the decision device comprising:
    an analysis engine to:
        receive an information resource and at least one product parameter, the information resource provides a general resource that does not provide a static web address identifiable at the time the information code is generated, search the information resource using the at least one product parameter to identify at least one search result, and dynamically analyze the at least one search result to provide the product resource, wherein the product resource includes information related to a product and the at least one product parameter.

7. The decision device of claim 6, wherein the analysis engine receives the information resource and the at least one product parameter from a decode engine, the decode engine decodes the information resource and the at least one product parameter from the information code.

8. The decision device of claim 7, wherein the decode engine receives the information code from a reader device, that scans the information code from the product.

9. The decision device of claim 6, further comprising a display connected thereto, the display provides the product resource to a user via a user interface connected to the decision device.

10. A method to obtain a product resource, the method comprising:

receiving, with a decision device, an information resource and at least one product parameter, the information resource provides a general resource that does not provide a static web address identifiable at the time the information code is generated;

searching, with the decision device, the information resource with the at least one product parameter to identify at least one search result; and dynamically analyzing, with the decision device, the at one least search result to provide the product resource, such that the product resource includes information related to a product and the at least one product parameter.

11. The method of claim 10, further comprising generating, with a code generation device the information code, the code generation device connected to the product.

12. The method of claim 11, further comprising displaying the product resource to a user via a user interface connected to the decision device.

13. The method of claim 10, further comprising decoding an information code to obtain the information resource and the at least one product parameter.

14. The method of claim 10, further comprising obtaining an information code having the information resource and the at least one product parameter encoded therein from the product by scanning the information code with a reader device connected to the decision device.

15. The method of claim 10, further comprising providing the at least one product parameter with the product resource.

* * * * *

UNITED STATES PATENT AND TRADEMARK OFFICE
CERTIFICATE OF CORRECTION

| | | |
|---|---|---|
| PATENT NO. | : 9,177,032 B2 | Page 1 of 1 |
| APPLICATION NO. | : 14/240391 | |
| DATED | : November 3, 2015 | |
| INVENTOR(S) | : Stephen M. DeRoos et al. | |

It is certified that error appears in the above-identified patent and that said Letters Patent is hereby corrected as shown below:

IN THE CLAIMS

In column 10, lines 4-5 approx., in Claim 10, delete "at one least" and insert -- at least one --, therefor.

Signed and Sealed this
Twenty-second Day of March, 2016

Michelle K. Lee
*Director of the United States Patent and Trademark Office*